(12) United States Patent
Szeremeta et al.

(10) Patent No.: US 8,462,460 B1
(45) Date of Patent: Jun. 11, 2013

(54) SHOCK MOUNT AND RETAINER FOR A DISK DRIVE ENCLOSURE

(75) Inventors: Wally Szeremeta, Mission Viejo, CA (US); Chen Chan Tang, Dasi Township (TW)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/434,772

(22) Filed: Mar. 29, 2012

(51) Int. Cl.
*G11B 17/32* (2006.01)
*G06F 1/16* (2006.01)

(52) U.S. Cl.
USPC .................................. 360/97.19; 361/679.36

(58) Field of Classification Search
USPC ............ 360/97.19, 265.5; 361/679.3, 679.01, 361/679.41, 679.48, 679.4, 679.58, 679.36, 361/679.33
See application file for complete search history.

(56) References Cited

U.S. PATENT DOCUMENTS

| | | |
|---|---|---|
| 4,713,714 A | 12/1987 | Gatti et al. |
| 4,831,476 A | 5/1989 | Branc et al. |
| 5,004,207 A | 4/1991 | Ishikawa et al. |
| 5,041,924 A | 8/1991 | Blackborow et al. |
| 5,081,551 A | 1/1992 | Aruga |
| 5,124,855 A | 6/1992 | Dew et al. |
| 5,216,582 A | 6/1993 | Russell et al. |
| 5,223,996 A | 6/1993 | Read et al. |
| 5,349,486 A | 9/1994 | Sugimoto et al. |
| 5,463,527 A | 10/1995 | Hager et al. |
| 5,535,092 A | 7/1996 | Bang |
| 5,654,875 A | 8/1997 | Lawson |
| 5,694,267 A | 12/1997 | Morehouse et al. |
| 5,757,617 A * | 5/1998 | Sherry .......................... 361/730 |
| 5,777,821 A | 7/1998 | Pottebaum |
| 6,125,097 A | 9/2000 | Wu |
| 6,130,817 A | 10/2000 | Flotho et al. |
| 6,154,360 A | 11/2000 | Kaczeus, Sr. et al. |
| 6,166,901 A | 12/2000 | Gamble et al. |
| 6,249,432 B1 | 6/2001 | Gamble et al. |
| 6,275,352 B1 | 8/2001 | Tadepalli et al. |
| 6,285,545 B1 | 9/2001 | Lopez |
| 6,292,359 B1 | 9/2001 | Boe |
| 6,487,039 B1 | 11/2002 | Bernett |
| 6,496,362 B2 | 12/2002 | Osterhout et al. |
| 6,498,722 B1 | 12/2002 | Stolz et al. |
| 6,545,865 B2 | 4/2003 | Albrecht et al. |
| 6,567,265 B1 | 5/2003 | Yamamura et al. |
| 6,618,246 B2 | 9/2003 | Sullivan et al. |
| 6,714,405 B2 | 3/2004 | Jitsukawa |
| 6,751,092 B1 | 6/2004 | Ohnishi et al. |

(Continued)

FOREIGN PATENT DOCUMENTS

EP 355534 A2 2/1990

OTHER PUBLICATIONS

Peter A. Masterson, "Isolation Techniques for 2.5-Inch Hard Disk Drives", 4 pages, https.//www.earsc.com.
Seagate "Disc Drive Acoustics", Oct. 2001, 7 pages.

(Continued)

*Primary Examiner* — Allen T Cao (57) ABSTRACT

One embodiment relates to an improved enclosure and shock mount for a disk drive. The enclosure and shock mount provide shock and vibration isolation to protect the components of the disk drive. In one embodiment, shock mounts are provided on the disk drive assembly. An enclosure comprises an upper component and a lower component. Retaining features are provided to join the enclosure together and captivate the shock mounts with a desired pre-load.

19 Claims, 7 Drawing Sheets

U.S. PATENT DOCUMENTS

| | | | |
|---|---|---|---|
| 6,873,524 B2 * | 3/2005 | Kaczeus et al. | 361/679.33 |
| D512,422 S | 12/2005 | Sato et al. | |
| 7,106,582 B2 | 9/2006 | Albrecht et al. | |
| 7,106,583 B2 | 9/2006 | Koh et al. | |
| 7,187,543 B2 | 3/2007 | Zimlin | |
| 7,215,506 B2 | 5/2007 | Albrecht et al. | |
| 7,227,761 B2 | 6/2007 | Estes et al. | |
| 7,312,982 B2 | 12/2007 | Bruner et al. | |
| 7,450,375 B2 | 11/2008 | Xu | |
| 7,471,509 B1 | 12/2008 | Oliver | |
| 7,480,136 B2 | 1/2009 | Lalouette | |
| 7,483,238 B2 * | 1/2009 | Xu et al. | 360/97.19 |
| 7,561,375 B2 * | 7/2009 | Kim et al. | 360/97.19 |
| 7,701,705 B1 | 4/2010 | Szeremeta | |
| 8,300,352 B1 | 10/2012 | Larson et al. | |
| 2003/0174464 A1 | 9/2003 | Funawatari et al. | |
| 2004/0032711 A1 * | 2/2004 | Kaczeus et al. | 361/685 |
| 2004/0255313 A1 * | 12/2004 | Kaczeus et al. | 720/651 |
| 2005/0088778 A1 | 4/2005 | Chen et al. | |
| 2005/0180045 A1 | 8/2005 | Tsuda et al. | |
| 2005/0185326 A1 | 8/2005 | Bruner et al. | |
| 2005/0275966 A1 | 12/2005 | Janik et al. | |
| 2006/0002076 A1 | 1/2006 | Albrecht et al. | |
| 2006/0158775 A1 | 7/2006 | Sega et al. | |
| 2007/0076327 A1 * | 4/2007 | Yang et al. | 360/294.4 |
| 2010/0290154 A1 | 11/2010 | Kim et al. | |

OTHER PUBLICATIONS

Shawn Casey, "Hard Drive Mounting in Notebook Computer Systems", 2579-771615-A00-P2, Feb. 2011, 29 pages, Western Digital White Paper available at www.wdc.com.

* cited by examiner

SHOCK MOUNT AND RETAINER FOR A DISK DRIVE ENCLOSURE

BACKGROUND

Due to their sensitive components, disk drives are vulnerable to externally induced shocks and vibrations. Because magnetic disk drives are predominantly designed for operation in stationary environments, external shock and vibration protection is often required to improve the robustness of disk drives in mobile applications. To fulfill this requirement, vibration and shock protective cases are often used to carry and transport small external disk drives.

It is a common practice to provide an internal shock and vibration isolation to a portable disk drive encased in a plastic enclosure. Conventionally, elastomeric mounts having various geometric shapes are used to support the disk drive and to provide the necessary shock and vibration isolation within its plastic enclosure. Typically, these mounts are often custom molded to fit the disk drive assembly and the enclosure.

However, the known implementations of shock mounts in many disk drive enclosures are rather poor because they have poor shock isolation efficiency. Unfortunately, it is difficult to design a proper shock and vibration isolation mechanical system. Ideally, a shock and vibration isolation system balances the stiffness in the shock mount and shock mount supporting structures and a desired shock mount pre-load. The challenge is to design a relatively stiff shock mount supporting structure with the known materials, such as plastic.

BRIEF DESCRIPTION OF THE DRAWINGS

Systems and methods which embody the various features of the invention will now be described with reference to the following drawings, in which.

DETAILED DESCRIPTION

One embodiment relates to an improved enclosure and shock and vibration isolation system for an external disk drive. In one embodiment, a disk drive assembly comprises four shock mounts placed near the corners of the assembly. An enclosure encloses the disk drive and comprises an upper component and a lower component. In one embodiment, the enclosure is constructed from plastic. Retaining features are provided to join the components of the enclosure together and captivate the shock mounts within pockets with a desired pre-load. In one embodiment, the retaining features surround the shock mounts and mate to each other with self-locking latches.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
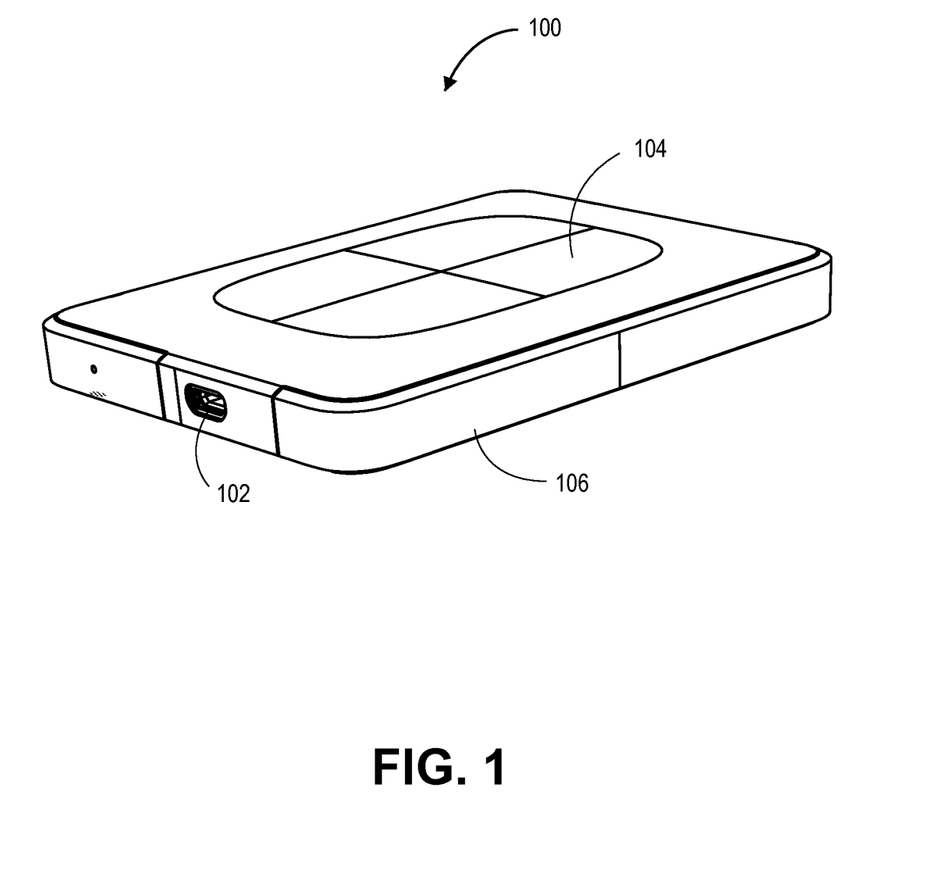
FIG. 1 shows a perspective view of an exemplary external disk drive.

FIG. 1 shows a perspective view of an exemplary external disk drive 100. As shown, the disk drive 100 may provide an opening 102 for a connector and may be enclosed by an upper portion 104 and a lower portion 106.

As an external drive, the opening 102 may be for various known communications connectors, such as a Universal Serial Bus (USB) connector, FireWire, etc. Disk drive 100 may support any communications interface.

Figure 2:
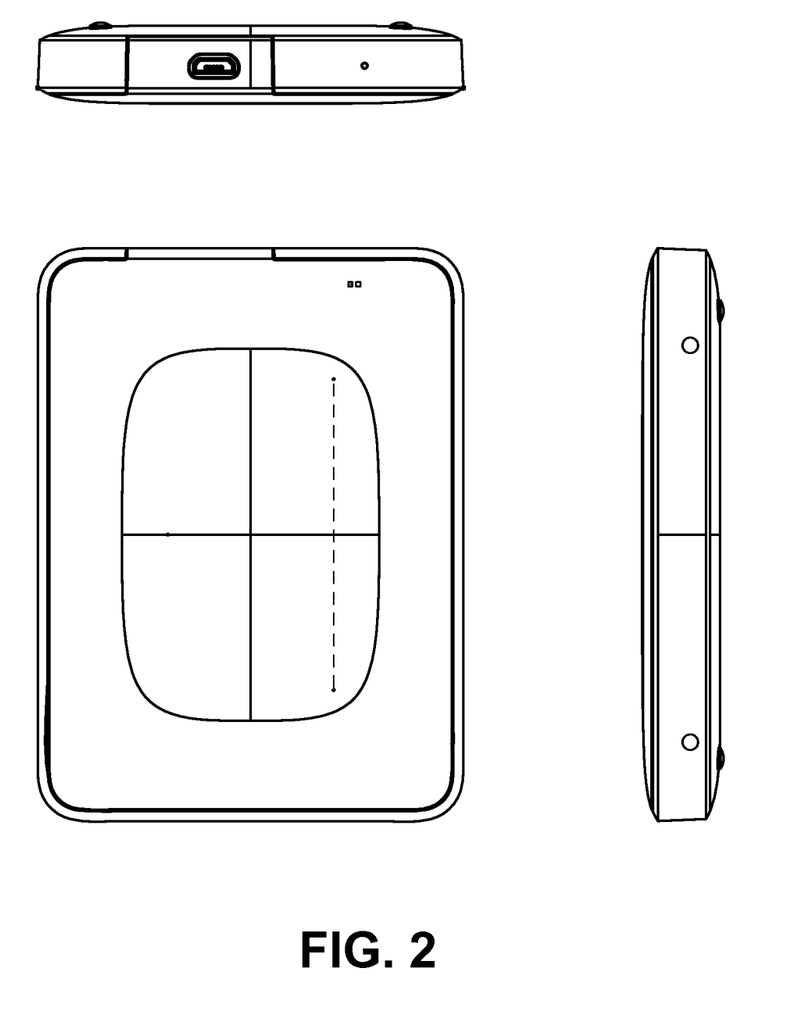
FIG. 2 shows a top and side views of the exemplary external disk drive shown in FIG. 1.

Portions 104 and 106 collectively provide an enclosure for the disk drive 100. Portions 104 and 106 may be constructed from various materials, such as plastic, metal, and the like. Portions 104 and 106 may be made from the same or different material. In addition, portions 104 and 106 may be attached to other in a variety of ways, such as adhesive, latches, fasteners, etc. For purposes of illustration, FIG. 2 is also provided to shows a top and side views of the disk drive 100 shown in FIG. 1.

Figure 3:
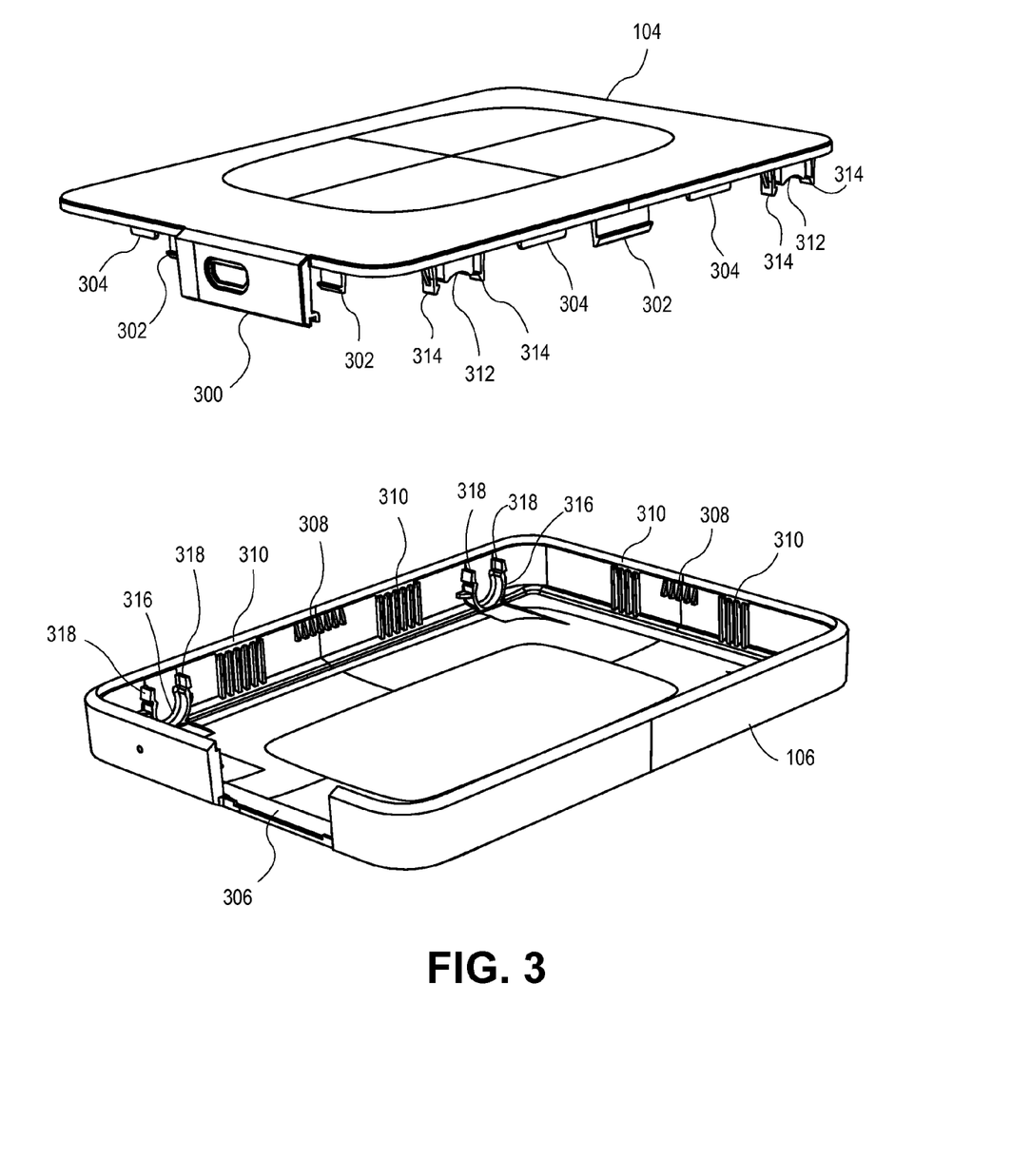
FIG. 3 shows an exploded view of an enclosure for an external disk drive showing exemplary retaining features and pockets for the shock mounts in accordance with one embodiment.

FIG. 3 shows an exploded view of an enclosure for an external disk drive showing exemplary retainers for shock mounts in accordance with one embodiment. As shown, various feature of upper portion 104 and lower portion 106 are shown.

In one embodiment, upper portion 104 may comprise a tab 300, latches 302, and alignment tabs 304 and lower portion 106 may comprise an opening or slot 306, latching structures 308, and alignment structures 310. Slot 306 provides an opening for receiving tab 300. Latches 302 are configured to lock or mate onto corresponding mating latches (not shown in FIG. 4) on portion 104 to hold portions 104 and 106 together. Alignment tabs 304 and alignment structures 310 serve as alignment aids for properly fitting portions 104 and 106 together. These structures may be integral to portions 104 and 106 or may be attached as separate components. For example, in one embodiment, portions 104 and 106 are molded from plastic material to include these structures.

In addition, portions 104 and 106 may comprise various retaining features for shock mounts on a disk drive assembly (not shown in FIG. 3). In one embodiment, upper portion 104 may comprise pockets 312 and mounting latches 314 and lower portion 106 may comprise pockets 316 and mounting latches 318. As shown, pockets 312 and 316 define a space for nesting and captivating the shock mounts (not shown in FIG. 3). In one embodiment, the pockets 312 and 316 define at least a partially circular space or pocket. Pockets 312 and 316, however, may be configured to define a space of any shape depending on the desired shock mount.

Figure 4:
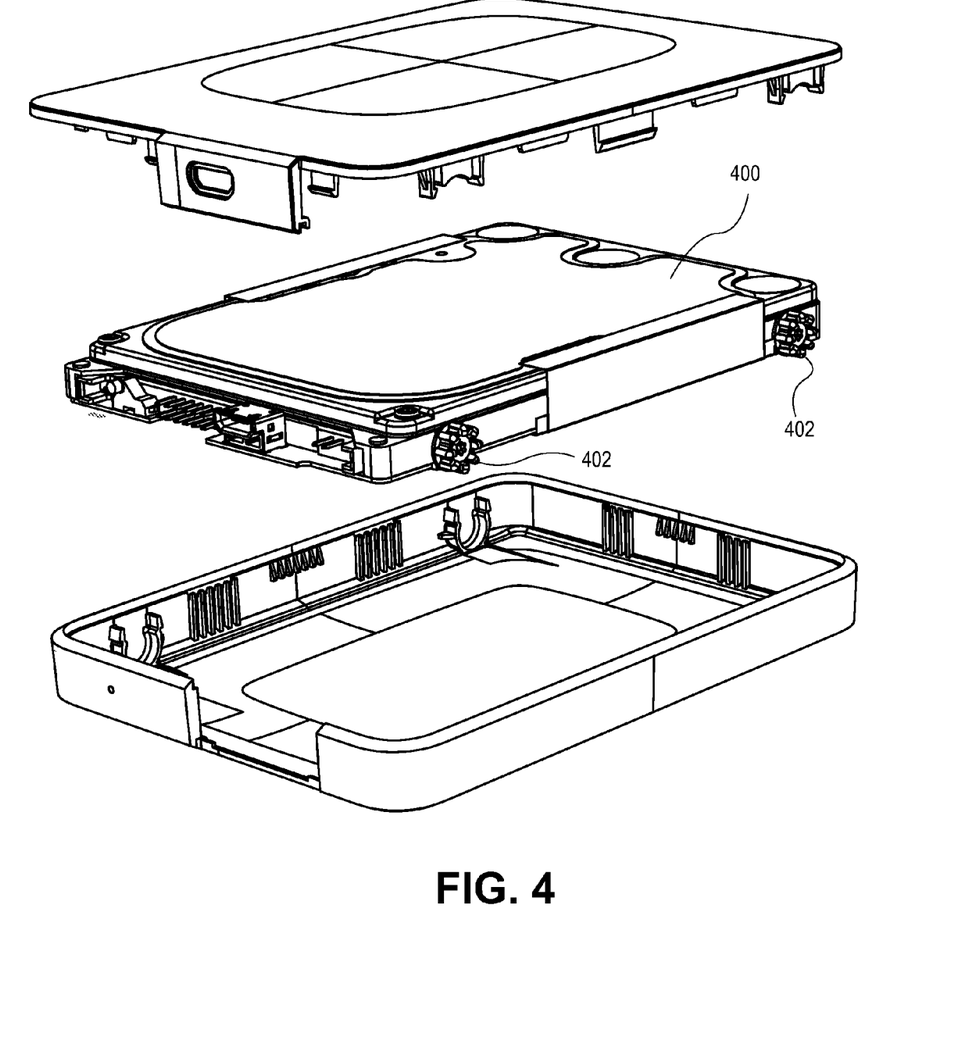
FIG. 4 shows an exploded view of an enclosure and disk drive assembly showing exemplary retaining features and shock mounts in accordance with one embodiment.

Mounting latches 314 and 318 serve as retaining structures for mating pockets 312 and 316 together to hold the shock mounts, such as shock mount 402 shown in FIG. 4. As shown, the mounting latches 314 and 318 are configured as self-locking latches. However, pockets 312 and 316 may be coupled together by a variety of attachment structures, such as press fit latches, screws, and the like.

In one embodiment, mounting latches 318 extend directly as structures from pockets 316. This provides a latching force that is in close proximity to the center of the shock mount. By latching in close proximity to the shock mounts in this manner, the shock mounts may be captivated more precisely and more securely. In addition, this form of secure retention ensures that the shock mounts 402 remain captivated during shock and vibration conditions.

In contrast, in the prior art, the shock mounts were not captivated in this fashion. Thus, during shock conditions especially, a shock mount may lose its preload and become free or loose from the enclosure and allow the disk drive assembly subject to excessive shock and vibration. The embodiments of the present disclosure can thus provide an improved retention of the shock mounts.

FIG. 4 shows an exploded view of an enclosure and disk drive assembly showing exemplary retaining features and shock mounts in accordance with one embodiment. As shown, a disk drive assembly 400 may comprise shock mounts 402. In this embodiment, the disk drive assembly 400 is provided four shock mounts generally in close proximity placed at the corners of the assembly 400. In one embodiment, the disk drive assembly 400 has standard mounting holes, and thus, in this case, the existing mounting holes are used for shock mounts 402. However, any number of shock mounts may be located on the disk drive assembly. The placement of the shock mounts may be in accordance with various design guidelines to provide a stable shock isolation platform. For example, the shock mount isolation may comprise pockets for the shock mounts at strategic locations to define a plane. In one embodiment, the shock mounts are configured to have the same stiffness. In another embodiment, one or more of the shock mounts is stiffer than the other shock mounts.

In one embodiment, the shock mounts 402 are a grommet-like structure that is generally cylindrical in shape and having ribs extending radially. As shown, the shock mounts 402 may comprise 8 ribs distributed radially to provide a desired shock and vibration isolation. Shock mounts 402 may employ any number of ribs in other embodiments. Of course, shock mounts 402 may employ other shapes, such as cylindrical, hexagonal, square, etc.

The shock mounts 402 may be constructed from various elastic materials, such as an elastomer, plastic, rubber, etc. As can be seen, in this embodiment, all of the shock mounts 402 share the same shape. This feature avoids the need for custom shock mounts at different locations on the disk drive assembly 400.

Figure 5:
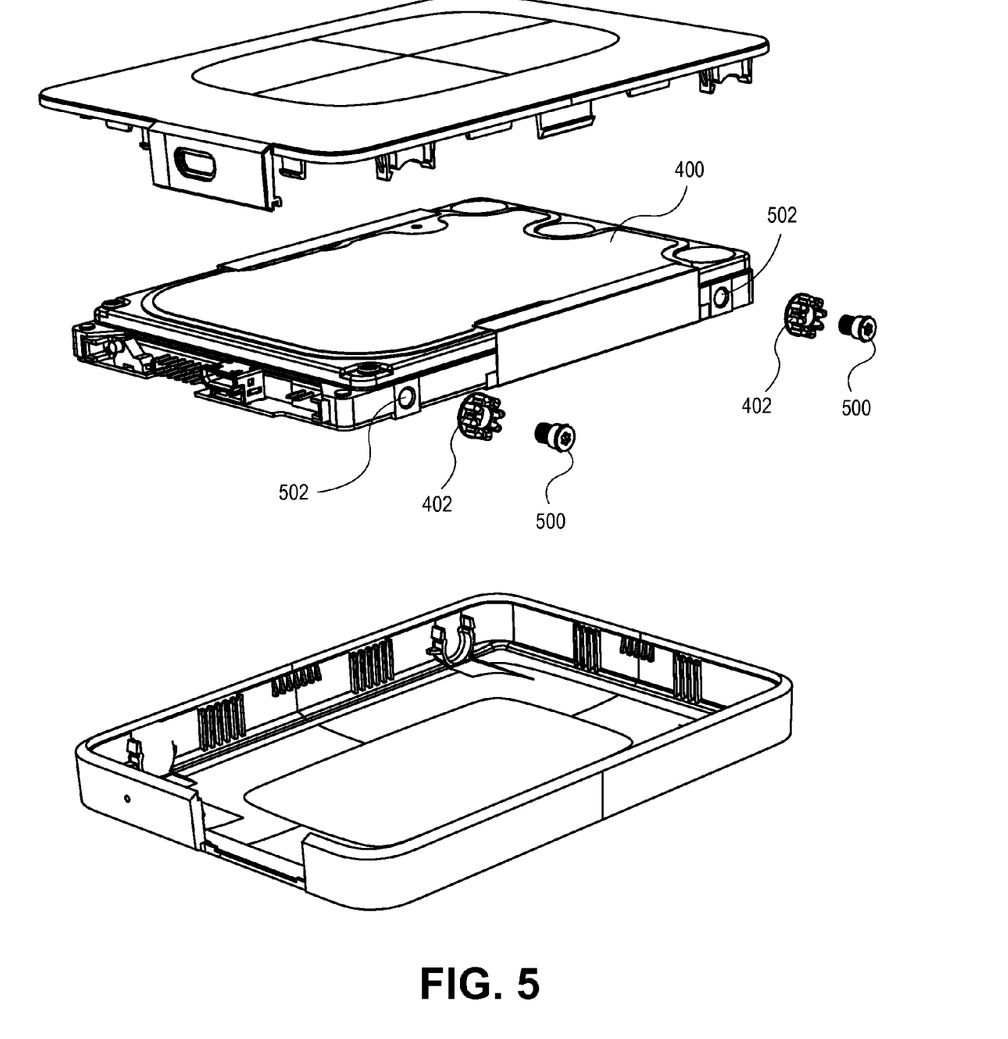
FIG. 5 shows an exploded view of the shock mount in accordance with one embodiment.

FIG. 5 shows an exploded view of the shock mount in accordance with one embodiment. As shown, the shock mounts 402 are attached to the disk drive assembly 400 with screws 500 into receiving holes 502. In one embodiment, the shock mounts 402 are screwed into pre-existing, standard holes used to mount the disk drive assembly internally. Those skilled in the art will recognize that shock mounts 402 may be attached to the disk drive assembly 400 by other means, such as adhesive.

Figure 6:
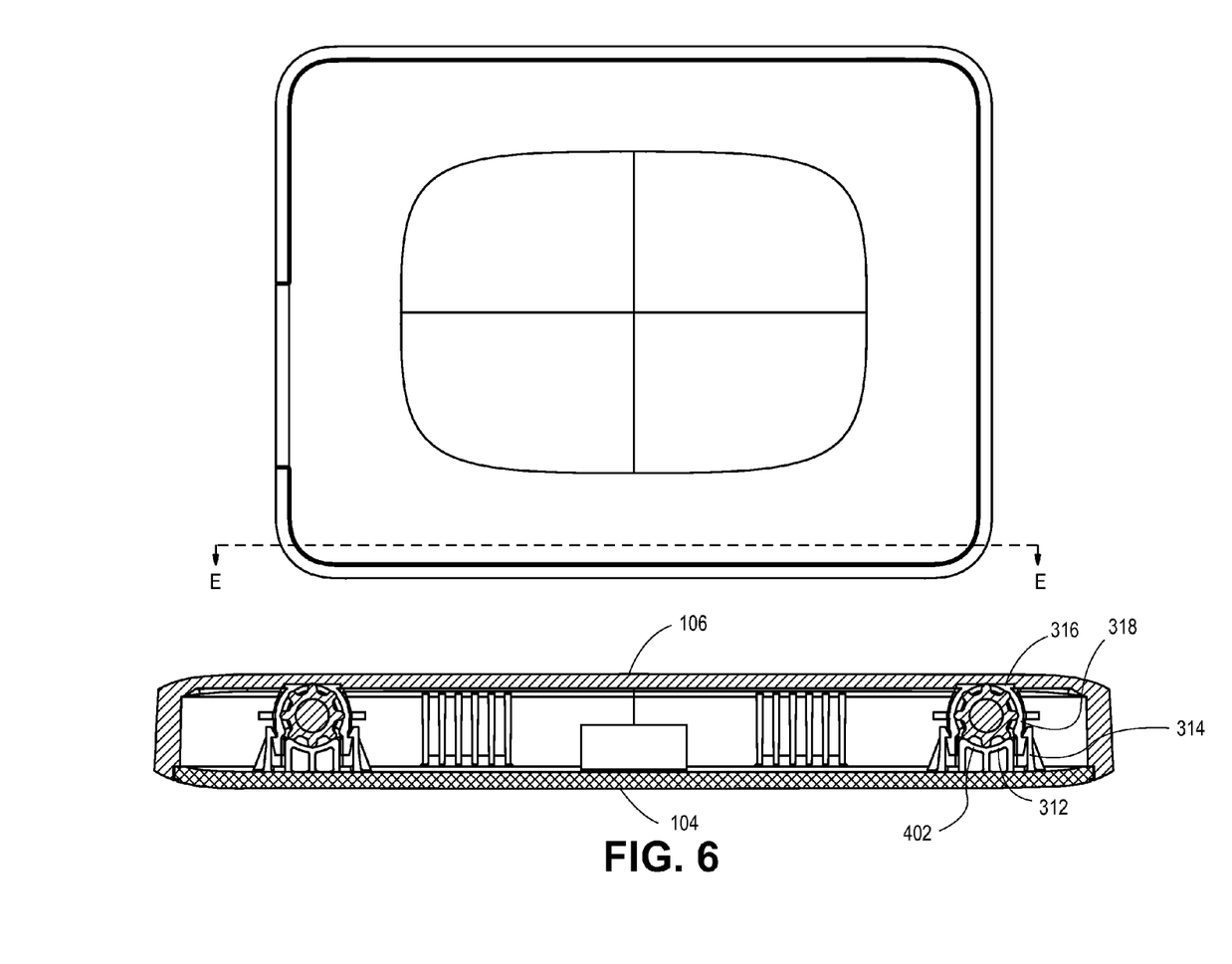
FIG. 6 shows a side view and cross section view of an enclosure for an external disk drive and shock mounts in accordance with one embodiment.
Figure 7:
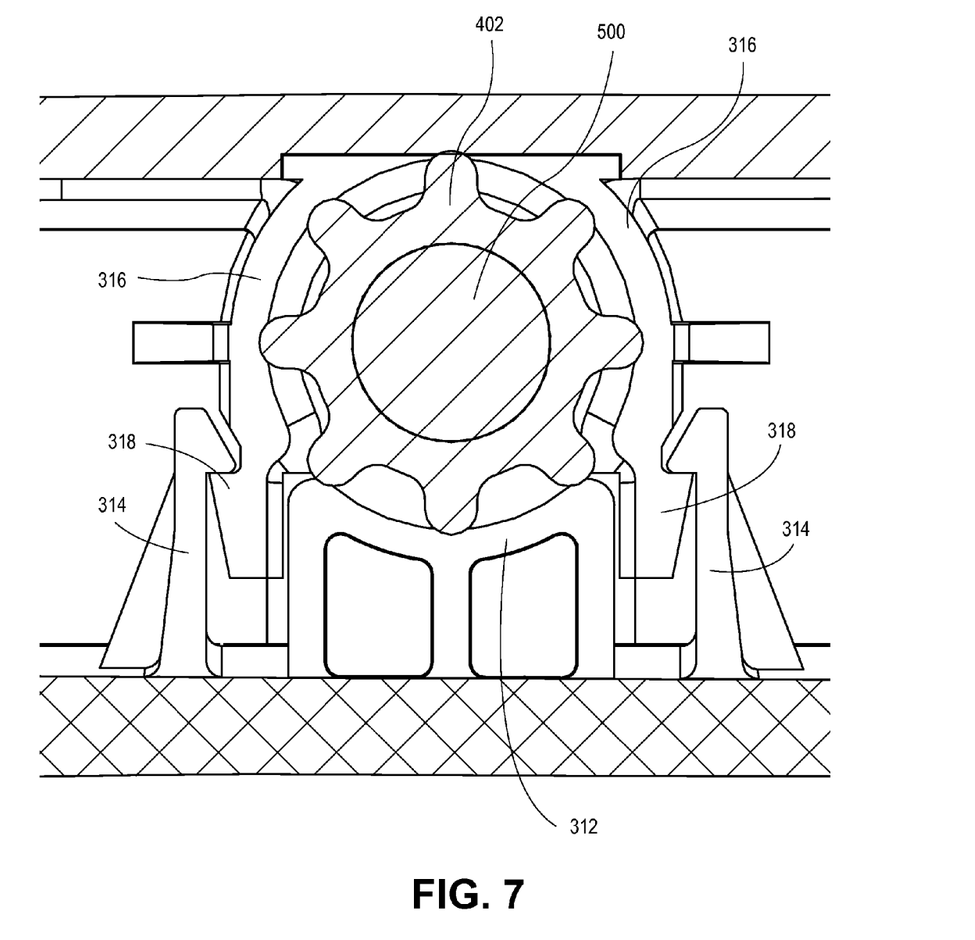
FIG. 7 shows a more detailed view of a shock mount in accordance with one embodiment.

FIG. 6 shows a side view and cross section view of an enclosure for an external disk drive and shock mounts in accordance with one embodiment. As shown, when mated, portions 104 and 106 provide mounting structures that are configured to captivate the shock mounts 402. In particular, pockets 312 and 316 substantially enclose or surround the shock mount 402. In addition, mounting latches 314 and 318 may be configured to latch to each other with sufficient force to provide a desired pre-load on shock mounts 402. FIG. 7 shows a more detailed view of how mounting latches 314 and 318 retain and enclosing the shock mount 402 between pockets 312 and 316 in accordance with one embodiment.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. An enclosure for a disk drive assembly configured to provide shock and vibration, said enclosure comprising:
 a first portion comprising a first set of pockets for contacting at least a portion of shock mounts mounted on the disk drive assembly; and
 a second portion comprising a second set of pockets contacting at least another portion of the shock mounts,
 wherein the first and second portions are configured to mate with each other to captivate the shock mounts with a predetermined pre-load.

2. The enclosure of claim 1, wherein the first set of pockets comprise a semi-circular nesting surface for the shock mount.

3. The enclosure of claim 1, wherein the first set of pockets comprises a set of press-fit latches.

4. The enclosure of claim 1, wherein the first set of pockets comprises a set of self-locking latches.

5. The enclosure of claim 1, wherein the first set of pockets and second set of pockets are configured to mate with each other based a set of latches placed within 5 mm from the center of the shock mount.

6. The shock mount system of claim 1, wherein first and second set of pockets provide at least a partially circular nesting surface surrounding the shock pockets.

7. The shock mount system of claim 6, wherein the first set of pockets comprises a set of latches configured to mate with corresponding latches on the second portion.

8. The shock mount system of claim 6, wherein the first set of pockets comprises a semi-circular shape spanning an arc of approximately 90 degrees.

9. The shock mount system of claim 6, wherein the second set of pockets comprises a semi-circular shape spanning an arc of approximately 270 degrees.

10. An external disk drive comprising:
 a disk drive assembly;
 a set of shock mounts mounted to the disk drive assembly, wherein the shock mounts are each cylindrically shaped and comprise radially extending ribs; and
 an enclosure enclosing the disk drive assembly and having
  a lower portion with lower pockets for holding the shock mount,
  an upper portion with upper pockets for holding the shock mount, and
  wherein the upper and lower pockets are configured to mate with each other and captivate the shock pockets with a predetermined pre-load.

11. The disk drive of claim 10, wherein the shock mounts comprise radially extending ribs that are spaced about 45 degrees apart.

12. The disk drive of claim 10, wherein the lower mount comprises a semi-circular nesting surface spanning an arc of about 90 degrees.

13. The disk drive of claim 10, wherein the lower mount comprises a semi-circular nesting surface spanning an arc of about 270 degrees.

14. The disk drive of claim 10, wherein the upper and lower pockets mate to each other based on press fit latches.

15. The disk drive of claim 10, wherein the upper and lower pockets mate to each other based on self-locking latches.

16. The disk drive of claim 10, wherein the shock pockets each comprise a flange section provided at one end of the cylindrical body for seating against the disk drive assembly, and a cushion section comprising a plurality of radially extending ribs configured to deform under mechanical shock and dampen vibration.

17. The disk drive of claim 16, wherein the cushion section is constructed from an elastomeric material.

18. The disk drive of claim 16, wherein the cushion section comprises ribs distributed about 45 degrees apart.

19. The disk drive of claim 10, wherein the upper pockets comprises latches extending from the pockets and configured to mate with latches on the lower portion.

\* \* \* \* \*